(12) United States Patent
Seki et al.

(10) Patent No.: US 7,978,103 B2
(45) Date of Patent: Jul. 12, 2011

(54) CODE AMOUNT ESTIMATING DEVICE, IMAGE CODING APPARATUS INCLUDING THE CODE AMOUNT ESTIMATING DEVICE, AND CODE AMOUNT ESTIMATING METHOD

(75) Inventors: Yukinaga Seki, Kyoto (JP); Takuma Chiba, Osaka (JP); Kenjiro Tsuda, Osaka (JP); Tatsuro Juri, Osaka (JP)

(73) Assignee: Panasonic Corporation, Osaka (JP)

( * ) Notice: Subject to any disclaimer, the term of this patent is extended or adjusted under 35 U.S.C. 154(b) by 3 days.

(21) Appl. No.: 12/724,561

(22) Filed: Mar. 16, 2010

(65) Prior Publication Data
US 2010/0238056 A1   Sep. 23, 2010

(30) Foreign Application Priority Data
Mar. 17, 2009   (JP) ................................ 2009-063837

(51) Int. Cl.
*H03M 7/00*   (2006.01)

(52) U.S. Cl. .............. 341/107; 341/51; 341/65; 341/67; 341/106; 375/240.12; 375/240.13; 375/240.16; 375/240.22; 375/282; 382/182; 382/232; 382/243; 382/248

(58) Field of Classification Search ............... 341/51, 341/65, 67, 106, 107; 382/182, 232, 239, 382/243, 248, 282; 375/240.12, 240.13, 375/240.16, 240.22, 240.27
See application file for complete search history.

(56) References Cited

U.S. PATENT DOCUMENTS

| 5,912,636 | A | * | 6/1999 | Gormish et al. | ................ | 341/50 |
| 6,058,216 | A | * | 5/2000 | Endo et al. | .................... | 382/247 |
| 6,072,909 | A | * | 6/2000 | Yokose et al. | ................ | 382/247 |
| 6,265,997 | B1 | * | 7/2001 | Nomizu | ......................... | 341/107 |
| 6,625,321 | B1 | * | 9/2003 | Li et al. | .......................... | 382/239 |
| 6,879,268 | B2 | * | 4/2005 | Karczewicz | ..................... | 341/67 |
| 6,954,156 | B2 | * | 10/2005 | Kadono et al. | ................... | 341/67 |
| 7,088,269 | B2 | * | 8/2006 | Kadono et al. | ................... | 341/67 |
| 7,190,289 | B2 | * | 3/2007 | Kobayashi et al. | ........... | 341/107 |
| 7,379,608 | B2 | * | 5/2008 | Marpe et al. | ................... | 382/247 |
| 7,439,880 | B2 | * | 10/2008 | Seki et al. | ........................ | 341/51 |
| 7,839,312 | B2 | * | 11/2010 | Tanaka et al. | .................. | 341/107 |
| 7,928,869 | B2 | * | 4/2011 | Sekiguchi et al. | ............ | 341/107 |
| 2005/0180505 | A1 | | 8/2005 | Ogawa et al. | | |

FOREIGN PATENT DOCUMENTS

| JP | 2005-203905 | 7/2005 |
| JP | 2008-011431 | 1/2008 |

* cited by examiner

*Primary Examiner* — Linh V Nguyen
(74) *Attorney, Agent, or Firm* — Wenderoth, Lind & Ponack, LLP.

(57) ABSTRACT

To provide a code amount estimating device which can perform, at high speed and with high precision, estimation of code amount obtained after arithmetic coding. The code amount estimating device includes a context index calculation unit which calculates a context index of a binary symbol included in binary data, and an estimate code amount calculation unit which calculates an estimate code amount for the binary data based on symbol occurrence probability information stored in association with the calculated context index and on a held probability interval range. The estimate code amount calculation unit estimates the code amount for the binary data according to code amount information indicating an association between (i) a combination of a binary symbol string including one or more binary symbols, symbol occurrence probability information, and a probability interval range and (ii) an estimate code amount for the binary symbol string.

14 Claims, 11 Drawing Sheets

| Binary symbol string | Input information | | | Estimate code amount | Output information | | |
|---|---|---|---|---|---|---|---|
| | Symbol occurrence probability information | | Probability interval range | | Symbol occurrence probability information | | Probability interval range |
| | Most probable symbol | Probability state index | | | Most probable symbol | Probability state index | |
| 0000 | 0 | 0 | 0 | 4 | 0 | 4 | 0 |
| | | | 1 | 4 | | | 1 |
| | | | 2 | 4 | | | 3 |
| | | | 3 | 3 | | | 0 |
| 0001 | 1 | 1 | 0 | 4 | 0 | 5 | 0 |
| | | | 1 | 4 | | | 3 |
| | | | 2 | 3 | | | 0 |
| | | | 3 | 3 | | | 1 |
| ... | ... | 2 | ... | ... | ... | ... | ... |
| ... | ... | ... | ... | ... | ... | ... | ... |
| ... | ... | ... | ... | ... | ... | ... | ... |

FIG. 7

Probability interval range updating table

| pStateIdx | qCodIRangeIdx | | | | pStateIdx | qCodIRangeIdx | | | | pStateIdx | qCodIRangeIdx | | | |
|---|---|---|---|---|---|---|---|---|---|---|---|---|---|---|
| | 0 | 1 | 2 | 3 | | 0 | 1 | 2 | 3 | | 0 | 1 | 2 | 3 |
| 0 | 128 | 176 | 208 | 240 | 22 | 46 | 56 | 66 | 76 | 44 | 14 | 18 | 21 | 24 |
| 1 | 128 | 167 | 197 | 227 | 23 | 43 | 53 | 63 | 72 | 45 | 14 | 17 | 20 | 23 |
| 2 | 128 | 158 | 187 | 216 | 24 | 41 | 50 | 58 | 69 | 46 | 13 | 16 | 19 | 22 |
| 3 | 123 | 150 | 178 | 205 | 25 | 39 | 48 | 56 | 65 | 47 | 12 | 15 | 18 | 21 |
| 4 | 116 | 142 | 169 | 195 | 26 | 37 | 45 | 54 | 62 | 48 | 12 | 14 | 17 | 20 |
| 5 | 111 | 135 | 160 | 185 | 27 | 35 | 43 | 51 | 59 | 49 | 11 | 14 | 16 | 19 |
| 6 | 105 | 128 | 152 | 175 | 28 | 33 | 41 | 48 | 58 | 50 | 11 | 13 | 15 | 18 |
| 7 | 100 | 122 | 144 | 166 | 29 | 32 | 39 | 46 | 53 | 51 | 10 | 12 | 15 | 17 |
| 8 | 95 | 116 | 137 | 158 | 30 | 30 | 37 | 43 | 50 | 52 | 10 | 12 | 14 | 16 |
| 9 | 90 | 110 | 130 | 150 | 31 | 29 | 35 | 41 | 48 | 53 | 9 | 11 | 13 | 15 |
| 10 | 85 | 104 | 123 | 142 | 32 | 27 | 33 | 39 | 45 | 54 | 9 | 11 | 12 | 14 |
| 11 | 81 | 99 | 117 | 117 | 33 | 26 | 31 | 37 | 43 | 55 | 8 | 10 | 12 | 14 |
| 12 | 77 | 94 | 111 | 128 | 34 | 24 | 30 | 35 | 41 | 56 | 8 | 9 | 11 | 13 |
| 13 | 73 | 89 | 105 | 122 | 35 | 23 | 28 | 33 | 39 | 57 | 7 | 9 | 11 | 12 |
| 14 | 69 | 85 | 100 | 116 | 36 | 22 | 27 | 32 | 37 | 58 | 7 | 9 | 11 | 12 |
| 15 | 66 | 80 | 95 | 110 | 37 | 21 | 26 | 30 | 35 | 59 | 7 | 8 | 10 | 11 |
| 16 | 62 | 76 | 90 | 104 | 38 | 20 | 24 | 29 | 33 | 60 | 6 | 8 | 10 | 11 |
| 17 | 69 | 72 | 86 | 99 | 39 | 19 | 23 | 27 | 31 | 61 | 6 | 7 | 9 | 10 |
| 18 | 59 | 69 | 81 | 94 | 40 | 18 | 22 | 26 | 30 | 62 | 6 | 7 | 8 | 9 |
| 19 | 53 | 65 | 77 | 89 | 41 | 17 | 21 | 25 | 28 | 63 | 2 | 2 | 2 | 2 |
| 20 | 51 | 62 | 73 | 85 | 42 | 16 | 20 | 23 | 27 | | | | | |
| 21 | 48 | 59 | 59 | 80 | 43 | 15 | 19 | 22 | 25 | | | | | |

FIG. 8

Probability state index updating table

| pStateIdx | 0 | 1 | 2 | 3 | 4 | 5 | 5 | 7 | 8 | 9 | 10 | 11 | 12 | 13 | 14 | 15 |
|---|---|---|---|---|---|---|---|---|---|---|---|---|---|---|---|---|
| transIdxLPS | 0 | 0 | 1 | 2 | 2 | 4 | 4 | 5 | 6 | 7 | 8 | 9 | 9 | 11 | 11 | 12 |
| transIdxMPS | 1 | 2 | 3 | 4 | 5 | 6 | 7 | 8 | 9 | 10 | 11 | 12 | 13 | 14 | 15 | 16 |
| pStateIdx | 16 | 17 | 18 | 19 | 20 | 21 | 22 | 23 | 24 | 25 | 26 | 27 | 28 | 29 | 30 | 31 |
| transIdxLPS | 13 | 13 | 15 | 15 | 16 | 16 | 18 | 18 | 19 | 19 | 21 | 21 | 22 | 22 | 23 | 24 |
| transIdxMPS | 17 | 18 | 19 | 20 | 21 | 22 | 23 | 24 | 25 | 26 | 27 | 28 | 29 | 30 | 31 | 32 |
| pStateIdx | 32 | 33 | 34 | 35 | 36 | 37 | 38 | 39 | 40 | 41 | 42 | 43 | 44 | 45 | 46 | 47 |
| transIdxLPS | 24 | 25 | 26 | 26 | 27 | 27 | 28 | 29 | 29 | 30 | 30 | 30 | 31 | 32 | 32 | 33 |
| transIdxMPS | 33 | 34 | 35 | 36 | 37 | 38 | 39 | 40 | 41 | 42 | 43 | 44 | 45 | 46 | 47 | 48 |
| pStateIdx | 48 | 49 | 50 | 51 | 52 | 53 | 54 | 55 | 56 | 57 | 58 | 59 | 60 | 61 | 62 | 63 |
| transIdxLPS | 33 | 33 | 34 | 34 | 35 | 35 | 35 | 36 | 36 | 36 | 37 | 37 | 37 | 38 | 38 | 63 |
| transIdxMPS | 49 | 50 | 51 | 52 | 53 | 54 | 55 | 56 | 57 | 58 | 59 | 60 | 61 | 62 | 62 | 63 |

FIG. 9

| Binary symbol string | Input information | | | Estimate code amount | Output information | | |
|---|---|---|---|---|---|---|---|
| | Symbol occurrence probability information | | Probability interval range | | Symbol occurrence probability information | | Probability interval range |
| | Most probable symbol | Probability state index | | | Most probable symbol | Probability state index | |
| 1 | 0 | 0 | 0 | 1 | 1 | 0 | 0 |
| | | | 1 | 1 | | | 1 |
| | | | 2 | 1 | | | 2 |
| | | | 3 | 1 | | | 3 |
| 11 | 0 | 1 | ... | ... | ... | ... | ... |
| 111 | 1 | ... | ... | ... | ... | ... | ... |
| 1111 | ... | ... | ... | ... | ... | ... | ... |
| 11111 | ... | ... | ... | ... | ... | ... | ... |
| 111111 | ... | ... | ... | ... | ... | ... | ... |

| Input value | Output binary symbol string | |
|---|---|---|
| | Prefix part | Suffix part |
| 1 | 0 | |
| 2 | 10 | |
| 3 | 110 | |
| 4 | 1110 | |
| 5 | 11110 | |
| 6 | 111110 | |
| 7 | 1111110 | |
| 8 | 11111110 | |
| 9 | 111111110 | |
| 10 | 1111111110 | |
| 11 | 11111111110 | |
| 12 | 111111111110 | |
| 13 | 1111111111110 | |
| 14 | 11111111111110 | |
| 15 | 111111111111111 | 0 |
| 16 | 111111111111111 | 100 |

FIG. 11

| Input information | | | Probability interval range | Estimate code amount | Output information | | Probability interval range |
|---|---|---|---|---|---|---|---|
| Binary symbol string | Symbol occurrence probability information | | | | Symbol occurrence probability information | | |
| | Most probable symbol | Probability state index | | | Most probable symbol | Probability state index | |
| 0 | 0 | 0 | 0 | 0 | 0 | 1 | 0 |
| | | | | 1 | 1 | | 1 |
| | | | | 2 | 1 | | 2 |
| | | | | 3 | 1 | | 3 |
| | | | 1 | ⋮ | ⋮ | ⋮ | ⋮ |
| | | 1 | ⋮ | ⋮ | ⋮ | ⋮ | ⋮ |
| 10 | ⋮ | ⋮ | ⋮ | ⋮ | ⋮ | ⋮ | ⋮ |
| 110 | ⋮ | ⋮ | ⋮ | ⋮ | ⋮ | ⋮ | ⋮ |
| 1110 | ⋮ | ⋮ | ⋮ | ⋮ | ⋮ | ⋮ | ⋮ |
| 11110 | ⋮ | ⋮ | ⋮ | ⋮ | ⋮ | ⋮ | ⋮ |
| 111110 | ⋮ | ⋮ | ⋮ | ⋮ | ⋮ | ⋮ | ⋮ |
| 1111110 | ⋮ | ⋮ | ⋮ | ⋮ | ⋮ | ⋮ | ⋮ |
| 11111110 | ⋮ | ⋮ | ⋮ | ⋮ | ⋮ | ⋮ | ⋮ |
| 111111110 | ⋮ | ⋮ | ⋮ | ⋮ | ⋮ | ⋮ | ⋮ |
| 1111111110 | ⋮ | ⋮ | ⋮ | ⋮ | ⋮ | ⋮ | ⋮ |
| 11111111110 | ⋮ | ⋮ | ⋮ | ⋮ | ⋮ | ⋮ | ⋮ |
| 111111111110 | ⋮ | ⋮ | ⋮ | ⋮ | ⋮ | ⋮ | ⋮ |
| 1111111111110 | ⋮ | ⋮ | ⋮ | ⋮ | ⋮ | ⋮ | ⋮ |
| 1111111111111 | ⋮ | ⋮ | ⋮ | ⋮ | ⋮ | ⋮ | ⋮ |

204c

CODE AMOUNT ESTIMATING DEVICE, IMAGE CODING APPARATUS INCLUDING THE CODE AMOUNT ESTIMATING DEVICE, AND CODE AMOUNT ESTIMATING METHOD

BACKGROUND OF THE INVENTION (1) Field of the Invention

The present invention relates to a code amount estimating device which estimates a code amount obtained after coding data of an image and to an image coding apparatus including the code amount estimating device, and particularly relates to a code amount estimating device which estimates a code amount obtained after arithmetic coding of binary data and to an image coding apparatus including such code amount estimating device.

(2) Description of the Related Art

With the development of digital image technology, recent years have seen a steady rise in the amount of data of image data, particularly video, being handled. For example, the amount of data of High Definition (HD) images, which have come into practical use in recent years, is about six times that of the conventional Standard Definition (SD) images.

On the other hand, with the improvement of the information processing performance of computers and other devices, video compression using complex calculation has become possible, and image data compression rate is being greatly enhanced. The recently standardized H.264/AVC is a standard which implements a compression rate that is approximately twice that of MPEG-2. H.264/AVC implements a high compression rate by combining many compression techniques. As such, the amount of calculation significantly increases compared to conventional compression methods.

Entropy coding (variable-length coding) is available as one compression technique utilized in AVC/H.264. Two methods known as Context-based Adaptive Variable Length Coding (CAVLC) and Context-based Adaptive Binary Arithmetic Coding (CABAC) are provided as entropy coding methods in H.264/AVC. Compared to CAVLC, CABAC requires more-complex computation but realizes a high code-compression rate.

Coding in CABAC is mainly divided into two processes. The first is binarization in which multi-value data to be coded is converted into binary data. The second is arithmetic coding in which arithmetic coding is performed on the binary data obtained through the binarization, while the occurrence probability of the binary data is calculated and updated.

In the arithmetic coding in CABAC, coding is performed using probability interval information and symbol occurrence probability information which were updated during the coding of an immediately preceding binary symbol. As such, in the arithmetic coding, there is a need to perform serial processing on a per binary symbol basis. However, in the arithmetic coding, when the data amount of the binary symbol becomes large, real-time processing becomes difficult, and measuring the code amount in real time may not always be possible. As such, there is a problem that the amount of code cannot be appropriately controlled based on the amount of code to be generated. In order to solve such problem, there is proposed, for example, a method of predicting the amount of code to be generated, based on prediction residual resulting from the performance of intra-frame and inter-frame prediction on an input image signal (see Patent Reference 1: Japanese Unexamined Patent Application Publication No. 2005-203905 for example).

SUMMARY OF THE INVENTION

However, in the conventional method in which provisional coding is performed without performing arithmetic coding, the processing method for actually performing arithmetic coding and the processing method for estimating the code amount are different, and thus there is the problem that estimating the code amount cannot be performed precisely.

The present invention is conceived in order to solve such conventional problem and has as an object to provide a code amount estimating device which can perform, at high speed and with high precision, the estimation of code amount for binary data after the arithmetic coding.

In order to achieve the aforementioned object, the code amount estimating device according to an aspect of the present invention is a code amount estimating device which calculates an estimate code amount that is estimated to be an amount of code obtained after arithmetic coding of binary data, the code amount estimating device including: a symbol occurrence probability information holding unit configured to hold, in association with a context index, symbol occurrence probability information indicating an occurrence probability of a binary symbol included in the binary data; a probability interval information holding unit configured to hold a probability interval range indicating a range of an interval on a probability number line; a context index calculation unit configured to calculate the context index of the binary symbol included in the binary data; and an estimate code amount calculation unit configured to calculate an estimate code amount for the binary data based on (i) the symbol occurrence probability information held in association with the calculated context index and (ii) the probability interval range that is held, wherein the estimate code amount calculation unit is configured to calculate the estimate code amount for the binary data according to code amount information indicating an association between (i) a combination of a binary symbol string, symbol occurrence probability information, and a probability interval range and (ii) an estimate code amount for the binary symbol string, the binary symbol string including one or more binary symbols.

Accordingly, since the estimate code amount for a binary symbol string can be calculated according to the code amount information indicating the association between a (i) corresponding combination of a binary symbol string, symbol occurrence probability information, and a probability interval range and (ii) an estimate code amount, the code amount obtained after arithmetic coding of binary data can be estimated at high speed and with high precision. As a result, the estimation of the code amount obtained after arithmetic coding of binary data can be performed in real time.

Furthermore, it is preferable that the probability interval range is represented using a bit precision that is lower than a bit precision of a probability interval range used in the arithmetic coding of the binary data.

Accordingly, since the number of combinations of a binary symbol string, symbol occurrence probability information, and a probability interval range in the code amount information can be reduced, the amount of data that needs to be held by the code amount estimating device can be reduced.

Furthermore, it is preferable that the code amount information includes a first table in which each of estimate code amounts is stored in association with a corresponding combination of a binary symbol string, symbol occurrence probability information, and a probability interval range, and that the estimate code amount calculation unit is configured to calculate the estimate code amount for the binary data by obtaining, with reference to the first table, an estimate code amount for each binary symbol string included in the binary data.

Accordingly, since the estimate code amount for a binary symbol string, which corresponds to a combination of the binary symbol string, symbol occurrence probability information, and a probability interval range, can be calculated by referring to the first table, the code amount obtained after arithmetic coding of binary data can be estimated at high speed and with high precision.

Furthermore, it is preferable that the code amount information includes a second table in which each of probability interval ranges obtained after arithmetic coding is stored in association with a corresponding combination of a binary symbol string, symbol occurrence probability information, and a probability interval range, and that for each binary symbol string included in the binary data, the estimate code amount calculation unit is configured to obtain a probability interval range, with reference to the second table, and to update the probability interval range held in the probability interval information holding unit to the obtained probability interval range.

Accordingly, since the probability interval range after arithmetic coding, which corresponds to a combination of a binary symbol string, symbol occurrence probability information, and the probability interval range can be obtained by referring to the second table, the held probability interval range can be updated to the probability interval range that will be needed when coding the next binary symbol string included in the binary data. Specifically, the code amount obtained after arithmetic coding of binary data can be estimated with high precision when arithmetic coding is performed consecutively on the binary symbol strings included in the binary data.

Furthermore, it is preferable that the code amount information includes a third table in which each of symbol occurrence probability information obtained after arithmetic coding is stored in association with a corresponding combination of a binary symbol string and symbol occurrence probability information, and that for each binary symbol string included in the binary data, the estimate code amount calculation unit is configured to calculate symbol occurrence probability information, with reference to the third table, and to update the symbol occurrence probability information held by the symbol occurrence probability information holding unit to the obtained symbol occurrence probability information.

Accordingly, since the symbol occurrence probability information after arithmetic coding, which corresponds to a combination of a binary symbol string and the symbol occurrence probability information can be obtained by referring to the third table, the held symbol occurrence probability information can be updated to the symbol occurrence probability information that will be needed when coding the next binary symbol string included in the binary data. Specifically, the code amount obtained after arithmetic coding of binary data can be estimated with high precision when arithmetic coding is performed consecutively on the binary symbol strings included in the binary data.

Furthermore, it is preferable that the estimate code amount calculation unit is configured to calculate the estimate code amount for the binary data by calculating, according to the code amount information, an estimate code amount for a binary symbol string made up of two or more consecutive binary symbols included in the binary data.

Accordingly, since the estimate code amount for a binary symbol string made up of two or more binary symbols can be calculated in one operation, the code amount can be estimated at a higher speed than when estimating the code amount on a per binary symbol basis.

Furthermore, it is preferable that the estimate code amount calculation unit is configured to calculate the estimate code amount for the binary data by calculating, according to the code amount information, an estimate code amount for a binary symbol string made up of one binary symbol or consecutive binary symbols included in the binary data and having a same calculated context index.

Accordingly, since there is no need to switch symbol occurrence probability information within a binary symbol string, the estimate code amount for one binary symbol string can be calculated in one operation. Therefore, the estimation of the code amount obtained after arithmetic coding of binary data can be performed at high speed.

Furthermore, it is preferable that the estimate code amount calculation unit is configured to calculate the estimate code amount for the binary data by calculating, according to the code amount information, an estimate code amount for a binary symbol string made up of one binary symbol or consecutive binary symbols included in the binary data and having a same value.

Accordingly, since the number of combinations of a binary symbol string, symbol occurrence probability information, and a probability interval range in the code amount information can be reduced, the amount of data that needs to be held by the code amount estimating device can be reduced.

Furthermore, it is preferable that the same value is 1.

Accordingly, the number of combinations of a binary symbol string, symbol occurrence probability information, and a probability interval range in the code amount information can be reduced. Furthermore, since the estimate code amount for binary symbols indicating "1", of which many are included in the binary data, can be calculated at high speed, it is possible to suppress the deterioration of estimation speed caused by the reduction in the number of combinations.

Furthermore, it is preferable that the estimate code amount calculation unit is configured to calculate the estimate code amount for the binary data by calculating, according to the code amount information, an estimate code amount for a binary symbol string that (i) is made up of one binary symbol or consecutive binary symbols included in the binary data and (ii) matches any of predetermined binary symbol strings, and that the predetermined binary symbol strings include (i) a binary symbol string having a length equal to or less than a predetermined symbol length and in which only the last binary symbol is 0 and (ii) a binary symbol string having the predetermined symbol length and in which all the binary symbols are 1.

Accordingly, the number of combinations of a binary symbol string, symbol occurrence probability information, and a probability interval range can be reduced. Furthermore, since the estimate code amount for binary symbols which have been binarized using the truncated unary binarization method, and of which many are included in the binary data, can be calculated at high speed, it is possible to suppress the deterioration of estimation speed caused by the reduction in the number of combinations.

Furthermore, it is preferable that the estimate code amount calculation unit is configured to calculate an estimate code amount for a binary symbol included in the binary data and coded using bypass coding, by counting the binary symbol.

Accordingly, the code amount obtained after arithmetic coding of binary data can be estimated at high speed and with high precision, even for binary symbols coded using bypass coding.

Furthermore, the image coding apparatus according to an aspect of the present invention is an image coding apparatus which codes image data, the image coding apparatus including: the code amount estimating device; and a code amount control unit configured to control a code amount obtained after arithmetic coding of the image data, using the estimate code amount calculated by the code amount estimating device.

Accordingly, during the coding of image data, the code amount for image data after coding can be controlled, adaptively and in real time, according to the code amount obtained after arithmetic coding of binary data which is estimated at high speed and with high precision by the code amount estimating device.

Furthermore, the code amount estimation method according to an aspect of the present invention is a code amount estimation method for calculating an estimate code amount that is estimated to be an amount of code obtained after arithmetic coding of binary data, the code amount estimating method including: calculating a context index of a binary symbol included in the binary data; and calculating an estimate code amount for the binary data based on (i) symbol occurrence probability information held in association with the calculated context index and (ii) the probability interval range that is held, wherein in the calculating of an estimate code amount, the estimate code amount for the binary data is calculated according to code amount information indicating an association between (i) a combination of a binary symbol string, symbol occurrence probability information, and a probability interval range and (ii) an estimate code amount for the binary symbol string, the binary symbol string including one or more binary symbols.

Accordingly, the same advantageous effect as the above-described code amount estimating device can be produced.

Furthermore, the integrated circuit according to an aspect of the present invention is an integrated circuit which calculates an estimate code amount that is estimated to be an amount of code obtained after arithmetic coding of binary data, the integrated circuit including: a symbol occurrence probability information holding unit configured to hold, in association with a context index, symbol occurrence probability information indicating an occurrence probability of a binary symbol included in the binary data; a probability interval information holding unit configured to hold a probability interval range indicating a range of an interval on a probability number line; a context index calculation unit configured to calculate the context index of the binary symbol included in the binary data; and an estimate code amount calculation unit configured to calculate an estimate code amount for the binary data based on (i) the symbol occurrence probability information held in association with the calculated context index and (ii) the probability interval range that is held, wherein the estimate code amount calculation unit is configured to calculate the estimate code amount for the binary data according to code amount information indicating an association between (i) a combination of a binary symbol string, symbol occurrence probability information, and a probability interval range and (ii) an estimate code amount for the binary symbol string, the binary symbol string including one or more binary symbols.

Accordingly, the same advantageous effect as the above-described code amount estimating device can be produced.

As is clear from the above description, according to the code amount estimating device in an aspect of the present invention, since the estimate code amount for a binary symbol string can be calculated according to code amount information indicating the association between a (i) corresponding combination of a binary symbol string, symbol occurrence probability information, and a probability interval range and (ii) an estimate code amount, the estimation of the code amount obtained after arithmetic coding of binary data can be performed at high speed and with high precision.

FURTHER INFORMATION ABOUT TECHNICAL BACKGROUND TO THIS APPLICATION

The disclosure of Japanese Patent Application No. 2009-063837 filed on Mar. 17, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a diagram showing an example of a code amount estimation table in the embodiment of the present invention;

FIG. 7 is a diagram showing a probability interval range updating table stipulated by H.264/AVC;

FIG. 8 is a diagram showing a probability state index updating table stipulated by H.264/AVC;

FIG. 9 is a diagram showing an example of a code amount estimation table in a first modification of the embodiment of the present invention;

FIG. 10 is a diagram for describing the method for binarizing quantized coefficients; and FIG. 11 is a diagram showing an example of the code amount estimation table in a second modification of the embodiment of the present invention.

DESCRIPTION OF THE PREFERRED EMBODIMENT(S)

Hereinafter, an embodiment of the present invention shall be described with reference to the Drawings.

Embodiment

Figure 1:
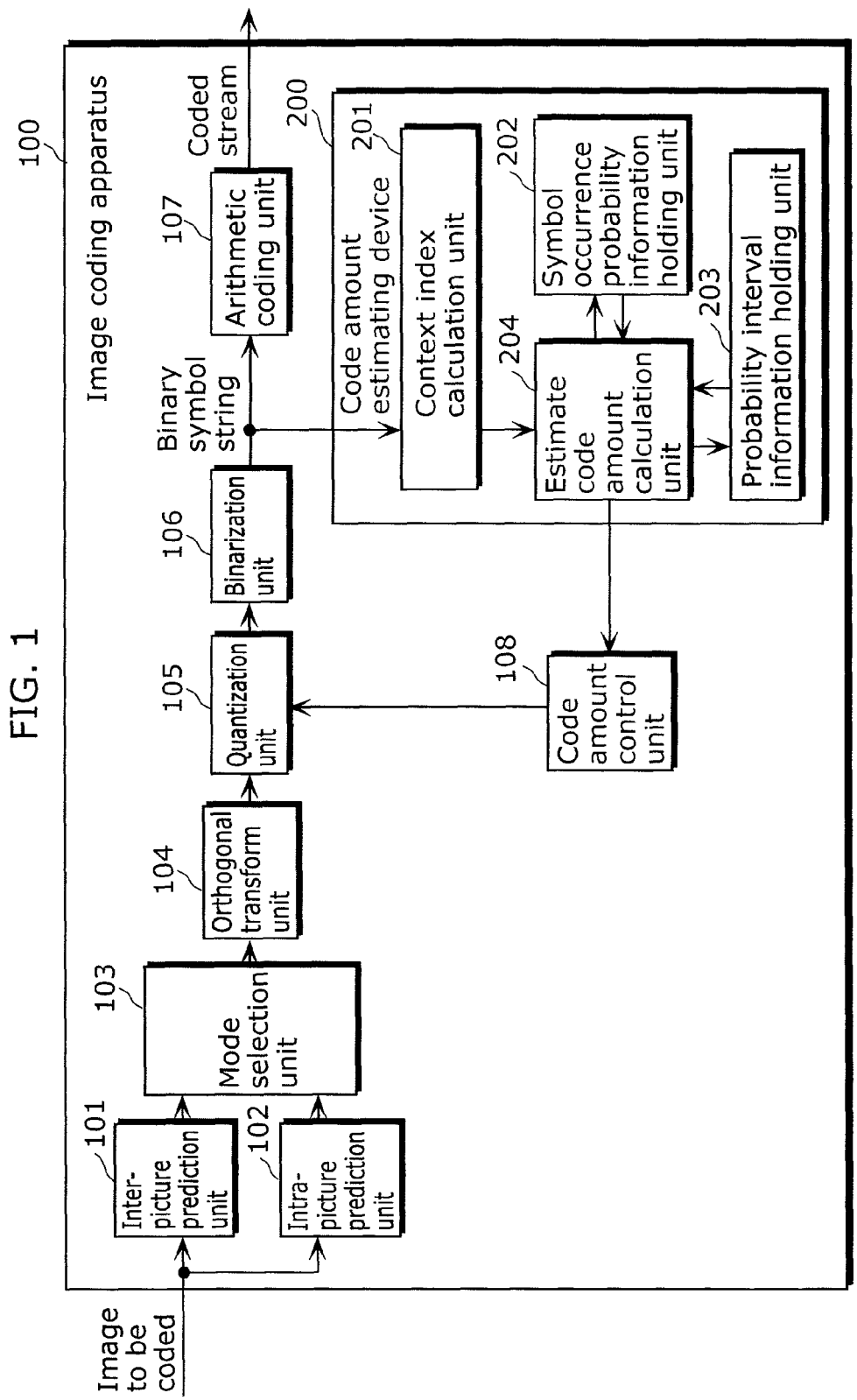
FIG. 1 is a block diagram showing the functional configuration of an image coding apparatus including a code amount estimating device in an embodiment of the present invention.

FIG. 1 is a block diagram showing the functional configuration of an image coding apparatus 100 including a code amount estimating device 200 in the embodiment of the present invention.

The image coding apparatus 100 is an apparatus which codes image data and is characterized by controlling the code amount of image data after coding by estimating the code amount to be obtained after arithmetic coding and adaptively changing coding parameters according to the estimated code amount. As shown in FIG. 1, the image coding apparatus 100 includes an inter-picture prediction unit 101, an intra-picture prediction unit 102, a mode selection unit 103, an orthogonal transform unit 104, a quantization unit 105, a binarization unit 106, an arithmetic coding unit 107, a code amount control unit 108, and the code amount estimating device 200.

It should be noted that image data to be coded is inputted to the inter-picture prediction unit 101 and the intra-picture prediction unit 102 in units of a block called a macroblock (MB). Furthermore, in the present embodiment, a binary symbol indicates a value included in binary data. Furthermore, a binary symbol string is a value formed by the gathering of values included in a binary data string. Specifically, a binary symbol string is a data string made up of one binary symbol or consecutive binary symbols.

The inter-picture prediction unit 101 detects an image block having a high correlation with the current MB to be coded, from a picture that is different from the picture including the current MB to be coded. In addition, the inter-picture prediction unit 101 calculates, as a prediction residual, the difference between the current MB to be coded and the detected image block. Subsequently, the inter-picture prediction unit 101 outputs, to the mode selection unit 103, the calculated prediction residual and a motion vector representing the amount of motion between the pictures.

The intra-picture prediction unit 102 predicts an image of the current MB to be coded within the picture, using the image of a block neighboring the current MB to be coded. In addition, the intra-picture prediction unit 102 obtains a prediction residual by calculating the difference between the current MB to be coded and the generated prediction image. Subsequently, the intra-picture prediction unit 102 outputs, to the mode selection unit 103, the calculated prediction residual and data indicating the prediction mode.

The mode selection unit 103 selects a prediction method for coding the current MB to be coded between inter-picture prediction and intra-picture prediction, based on the data outputted from the inter-picture prediction unit 101 and the intra-picture prediction unit 102. Subsequently, the mode selection unit 103 outputs, to the orthogonal transform unit 104, the prediction residual obtained using the selected prediction method.

The orthogonal transform unit 104 calculates an orthogonal transform coefficient by performing orthogonal transform on the inputted prediction residual. The orthogonal transform unit 104 outputs the calculated orthogonal transform coefficient to the quantization unit 105.

The quantization unit 105 quantizes the inputted orthogonal transform coefficient based on quantization information provided by the code amount control unit 108. Subsequently, the quantization unit 105 outputs the quantized orthogonal transform coefficient to the binarization unit 106.

Subsequently, the binarization unit 106 converts the quantized orthogonal transform coefficient into binary data and outputs the binary data to the arithmetic coding unit 107. In addition, the binarization unit 106 outputs the binary data to the code amount estimating device 200.

The arithmetic coding unit 107 performs arithmetic coding on the inputted binary data and outputs the arithmetic-coded data, as a coded stream, through the image coding apparatus 100.

Arithmetic coding is a coding method which performs interval subdivision of a probability number line according to an appearance probability of an inputted binary symbol string, and adopts a fractional value indicating a position within a subdivided interval as a code for the input sequence. It is known that the average code length is optimized for a stationary input signal.

Figure 2:
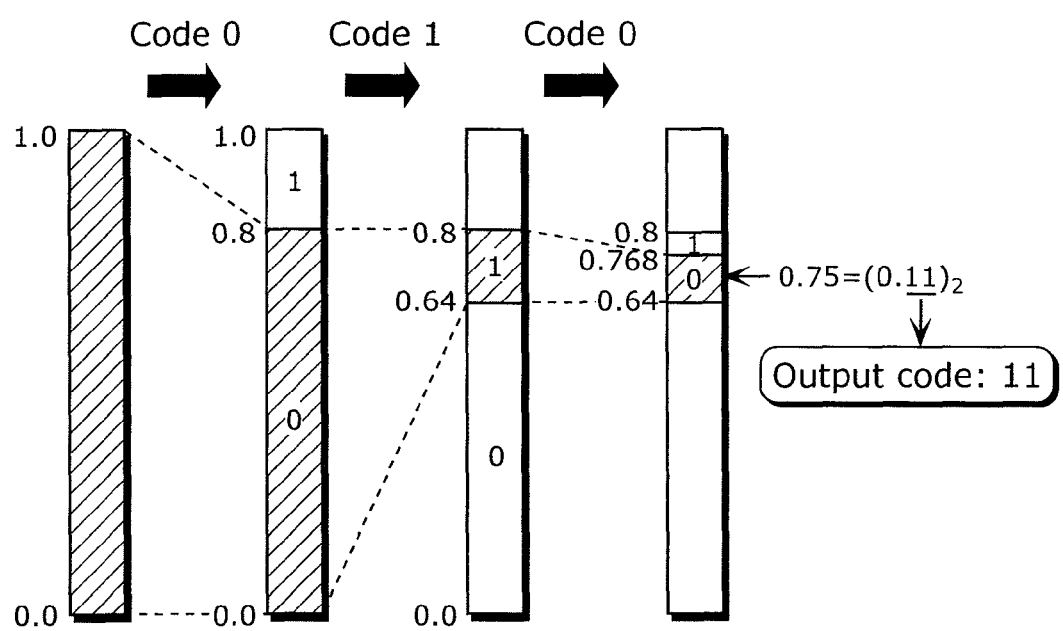
FIG. 2 is a diagram showing an example of the arithmetic coding in the embodiment of the present invention.

FIG. 2 is a diagram showing an example of the arithmetic coding in the embodiment of the present invention. Specifically, FIG. 2 is a diagram showing the processing in arithmetic coding when the inputted binary symbol string is "010", the occurrence probability of "0" is 0.8, and the occurrence probability of "1" is 0.2. First, when the binary symbol "0" is inputted, the interval 0.0 to 0.8, which is the lower 80 percent of the initial probability interval 0.0 to 1.0, becomes the new probability interval based on the fact that the occurrence probability of "0" is 0.8. Next, when the binary symbol "1" is inputted, the interval 0.64 to 0.8, which is the upper 20 percent of the probability interval 0.0 to 0.8, becomes the new probability interval based on the fact that the occurrence probability of "1" is 0.2. Lastly, the same processing is repeated when the binary symbol "0" is inputted, and a probability interval 0.64 to 0.768 is left in the end. The codeword is the binary representation of a fraction within the final probability interval that can be represented with the smallest bit width, and is $(0.11)_2$ in this case. Since the most significant digit is always "0", the output code becomes "11" resulting from the removal of such "0".

When coding inputted binary symbol strings in the above manner, a binary symbol string having a high occurrence probability is allotted a large probability interval. Since a large probability interval can be identified using fewer digits of actual numerical values, the code bits to be outputted are lessened. Specifically, since a short code bit is allotted to a binary symbol string having a high occurrence probability, the amount of code bits is reduced.

The code amount control unit 108 determines, based on the code amount (hereafter called "estimate code amount") estimated by the code amount estimating device 200, the quantization information to be used in the quantization by the quantization unit 105, so that the coded stream to be outputted by the arithmetic coding unit 107 approaches a predetermined bit rate. For example, the code amount control unit 108 determines the quantization step width according to the result of a comparison between the bit rate calculated based on the estimate code amount and the predetermined bit rate. Specifically, when the bit rate based on the estimate code amount is higher than the predetermined bit rate, the code amount control unit 108 suppresses the code amount by increasing the quantization step width to be used in the quantization by the quantization unit 105. Inversely, when the bit rate calculated based on the estimate code amount is lower than the predetermined bit rate, the code amount control unit 108 increases the code amount by reducing the quantization step width to be used in the quantization by the quantization unit 105.

The code amount estimating device 200 calculates the estimate code amount for the binary data outputted from the binarization unit 106, using calculation which approximates arithmetic coding, and outputs the calculated estimate code amount to the code amount control unit 108.

Hereinafter, the specific configuration of the code amount estimating device 200 and the code amount estimation method according to the approximate calculation of arithmetic coding shall be described with reference to the Drawings.

As shown in FIG. 1, the code amount estimating device 200 includes a context index calculation unit 201, a symbol occurrence probability information holding unit 202, a probability interval information holding unit 203, and an estimate code amount calculation unit 204.

The context index calculation unit 201 calculates the context index of a binary symbol according to the syntax of the inputted binary symbol and the coding conditions for the inputted picture and a neighboring MB. Furthermore, the context index calculation unit 201 collectively outputs, to the estimate code amount calculation unit 204, a binary symbol string made up of binary symbols for which the calculated context index is the same. Specifically, the context index calculation unit 201 outputs, to the estimate code amount calculation unit 204, a binary symbol string including only binary symbols corresponding to the same context index, among binary symbols corresponding to any of plural context indices.

It should be noted that it is preferable that the context index calculation unit 201 outputs, to the estimate code amount calculation unit 204, a binary symbol string that includes two or more binary symbols. With this, the estimate code amount calculation unit 204 can collectively output the estimate code amounts for two or more binary symbols, and thus the code amount obtained after arithmetic coding of binary data can be estimated at high speed.

The symbol occurrence probability information holding unit 202 holds symbol occurrence probability information in association with a corresponding context index. Symbol occurrence probability information is information indicating the occurrence probability of a binary symbol. Specifically, symbol occurrence probability information includes a most probable symbol (the symbol with the higher occurrence probability out of 0 and 1) vaIMPS and a probability state index pStateIdx.

In addition, the symbol occurrence probability information holding unit 202 outputs, to the estimate code amount calculation unit 204, the symbol occurrence probability information including the most probable symbol vaIMPS and the probability state index pStateIdx, which correspond to the context index outputted by the context index calculation unit 201.

Figure 3:
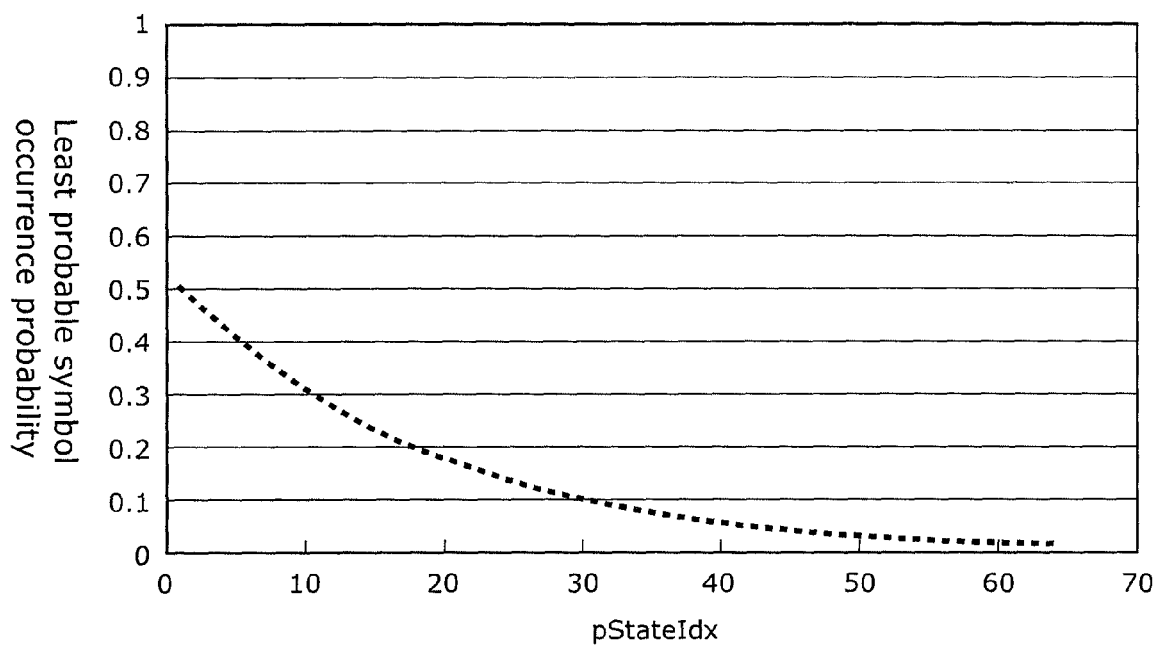
FIG. 3 is a diagram showing the relationship between a probability state index and the least probable symbol occurrence probability in the embodiment of the present invention.

Here, the probability state index pStateIdx shall be described using FIG. 3. FIG. 3 is a diagram showing the relationship between the probability state index and the least probable symbol occurrence probability in the embodiment of the present invention. Each probability state index pStateIdx is a value for identifying the 64-stage least probable symbol occurrence probability as shown in FIG. 3. The larger the value of the probability state index pStateIdx, the lower the least probable symbol occurrence probability becomes. In other words, the larger the value of the probability state index pStateIdx, the higher the occurrence probability of the most probable symbol becomes. Such probability state index pStateIdx is continually updated in accordance with the binary symbols inputted in the coding process.

The probability interval information holding unit 203 holds a probability interval range codIRange indicating the range of an interval on a probability number line. Specifically, the probability interval information holding unit 203 does not need to hold a probability interval lower limit value codILow necessary in determining a codeword, unlike in the case of the arithmetic coding of binary data in the arithmetic coding unit 107.

Furthermore, the probability interval range codIRange is represented using a bit precision that is lower than the 9-bit precision stipulated in H.264/AVC. Specifically, the probability interval range codIRange is represented using, for example, a 2-bit precision. More specifically, the value of the probability interval range codIRange is, for example, the value of the most significant two bits needed to obtain qCodIRangeIdx which is necessary for identifying the probability interval range after arithmetic coding in the arithmetic coding process.

The estimate code amount calculation unit 204 calculates, by referring to a table, the estimate code amount, the symbol occurrence probability information, and the probability interval range which correspond to the binary symbol string (hereafter called "input binary symbol string") outputted from the context index calculation unit 201, the symbol occurrence probability information outputted from the symbol occurrence probability information holding unit 202, and the probability interval range held by the probability interval information holding unit 203, respectively. The estimate code amount calculation unit 204 estimates the code amount obtained after arithmetic coding of the binary data including the input binary symbol string, using the estimate code amount for the input binary symbol string calculated in the above manner. In addition, the estimate code amount calculation unit 204 updates the held symbol occurrence probability information and probability interval range to the symbol occurrence probability information and the probability interval range which were calculated in the above manner.

Specifically, the estimate code amount calculation unit 204 calculates the estimate code amount for binary data by referring to a first table to obtain the estimate code amount for each input binary symbol string. Each of estimate code amounts is stored in the first table in association with a corresponding combination of a binary symbol string, symbol occurrence probability information, and a probability interval range. Furthermore, the first table is held in the estimate code amount calculation unit 204.

Furthermore, the estimate code amount calculation unit 204 obtains the probability interval range for each input binary symbol string by referring to a second table, and updates the probability interval range held by the probability interval information holding unit 203 to the obtained probability interval range. Probability interval ranges after arithmetic coding are each stored in the second table in association with a corresponding combination of a binary symbol string, symbol occurrence probability information, and a probability interval range. Furthermore, the second table is held in the estimate code amount calculation unit 204.

Furthermore, the estimate code amount calculation unit 204 obtains symbol occurrence probability information for each input binary symbol string by referring to a third table, and updates the symbol occurrence probability information held by the symbol occurrence probability information holding unit 202 to the obtained symbol occurrence probability information. Symbol occurrence probability information is each stored in the third table in association with a corresponding binary symbol string and symbol occurrence probability information. Furthermore, the third table is held in the estimate code amount calculation unit 204.

In the present embodiment, the estimate code amount calculation unit 204 holds a code amount estimation table 204a which corresponds to a table combining the aforementioned first table, second table, and third table. Hereinafter, the code amount estimation table 204a shall be described.

FIG. 4 is a diagram showing an example of the code amount estimation table in the embodiment of the present invention. As shown in FIG. 4, output information is stored in the code amount estimation table 204a in association with input information. Specifically, the code amount estimation table 204a corresponds to code amount information indicating the association between input information and output information.

The input information includes the probability interval range codIRange, the most probable symbol vaIMPS, the probability state index pStateIdx, and the binary symbol string. Furthermore, the output information includes the estimate code amount, the probability interval range codIRange, the most probable symbol vaIMPS, and the probability state index pStateIdx which correspond to the input information.

When the arithmetic coding unit 107 performs arithmetic coding on binary data according to H.264/AVC, the number of types of the values that are possible for each input information is: between 256 to 511 types for the probability interval range codIRange; 2 types for the most probable symbol vaIMPS, and 64 types for the probability state index pStateIdx. Here, when the symbol length of the binary symbol string included in the input information is represented as L, the number of combinations for the input information becomes an enormous number of $32768 \times 2^L$. By using a code amount estimation table that supports this number of combinations of input information, the code amount estimating device 200 can estimate a precise code amount. However, when such a code amount estimation table is to be held by the code amount estimating device 200, the circuit size becomes large and implementation becomes difficult.

Consequently, the probability interval information holding unit 203 in the present embodiment holds the value of the probability interval range codIRange with 2-bit precision. As such, the number of types of values possible for the probability interval range codIRange becomes 4 types. Therefore, the combinations for the input information necessary for estimating the code amount becomes $512 \times 2^L$, and thus allowing a significant reduction. Consequently, although the code amount estimation precision is marginally lower than when the probability interval information holding unit 203 holds the value of the probability interval range codIRange with 9-bit precision, circuit size can be significantly reduced.

It should be noted that the code amount estimation table 204a is generated before the code amount estimation by the code amount estimating device 200 is performed (typically before the code amount estimating device 200 is manufactured), and stored in the estimate code amount calculation unit 204.

Figure 5:
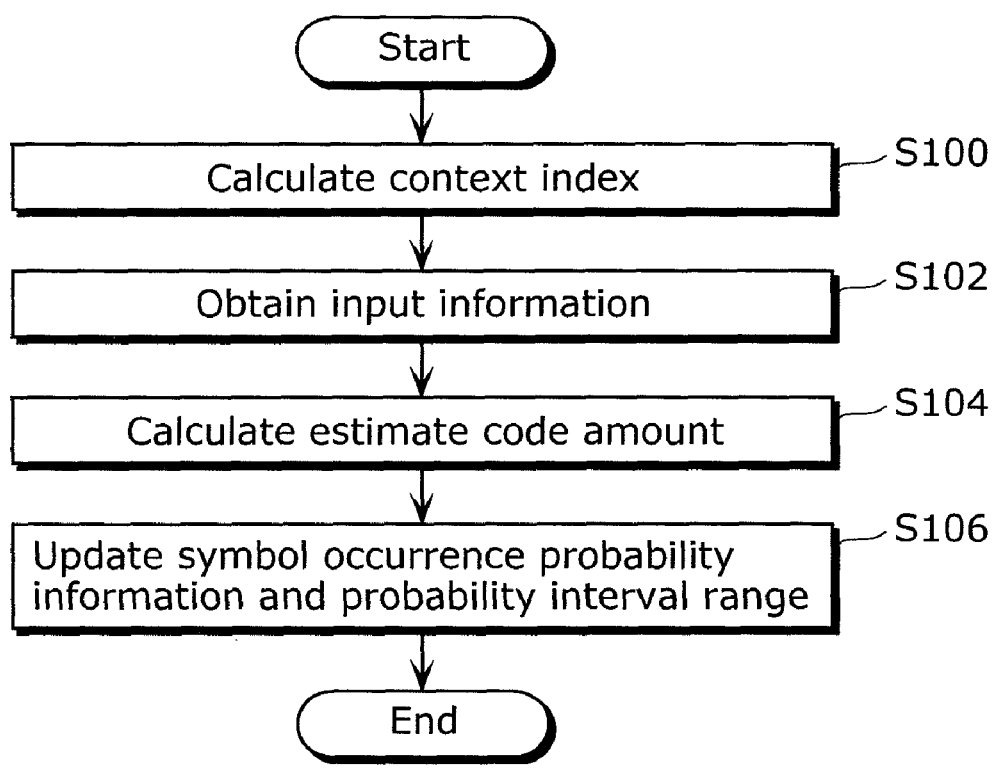
FIG. 5 is a flowchart showing the flow of the code amount estimation in the embodiment of the present invention.

Next, the respective operations of the code amount estimating device 200 configured in the above-described manner shall be described. FIG. 5 is a flowchart showing the flow of the code amount estimation in the embodiment of the present invention.

First, the context index calculation unit 201 calculates the context index of a binary symbol included in binary data (S100).

Next, the estimate code amount calculation unit 204 obtains input information (S102). Specifically, the estimate code amount calculation unit 204 obtains an input binary symbol string from the context index calculation unit 201. In addition, the estimate code amount calculation unit 204 obtains the symbol occurrence probability information held by the symbol occurrence probability information holding unit 202. Furthermore, the estimate code amount calculation unit 204 obtains the probability interval range held by the probability interval information holding unit 203.

Subsequently, the estimate code amount calculation unit 204 refers to the code amount estimation table 204a and obtains the output information corresponding to the input information (S104). Specifically, the estimate code amount calculation unit 204 obtains the estimate code amount, the symbol occurrence probability information, and the probability interval range for the input binary symbol.

Finally, the estimate code amount calculation unit 204 updates the held symbol occurrence probability information and probability interval range to the symbol occurrence probability information and probability interval range included in the output information (S106).

With this, the code amount estimating device 200 can obtain the estimate code amount for the input binary symbol string. In addition, the code amount estimating device 200 can calculate the estimate code amount for binary data made up of plural binary symbol strings, by repeating the above-described process and calculating the summation of the obtained estimate code amounts.

Next, the code amount calculation for calculating the estimate code amount, and so on, for storing in the code amount estimation table 204a shall be described.

Figure 6:
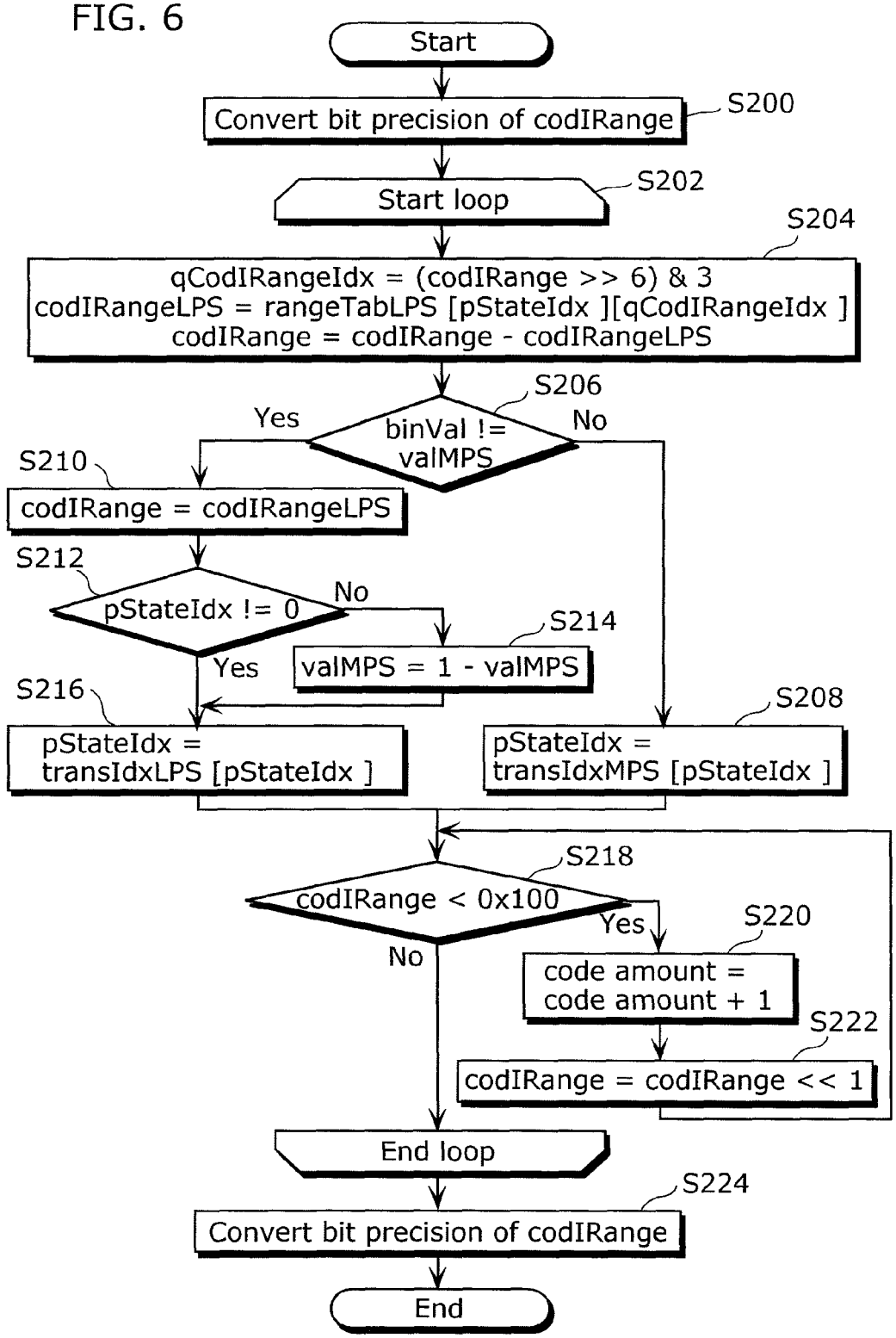
FIG. 6 is a flowchart showing the flow of the code amount calculation for calculating output information to be stored in the code amount estimation table in the embodiment of the present invention.

FIG. 6 is a flowchart showing the flow of the code amount calculation for calculating output information to be stored in the code amount estimation table in the embodiment of the present invention. Furthermore, FIG. 7 is a diagram showing a probability interval range updating table stipulated by H.264/AVC. Furthermore, FIG. 8 is a diagram showing a probability state index updating table stipulated by H.264/AVC.

It should be noted that in FIG. 6, the respective processes are executed by a code amount calculating device. The code amount calculating device may be included in the image coding apparatus 100 or the code amount estimating device 200, and may be a device which is independent of the image coding apparatus 100 and the code amount estimating device 200.

Furthermore, the flowchart shown in FIG. 6 starts from the state where one input information to be stored into the code amount estimation table is provided.

As shown in FIG. 6, first, the code amount calculating device converts the bit precision of the probability interval range codIRange (S200). Specifically, the code amount calculating device converts the probability interval range codIRange included in the input information into a probability interval range codIRange of the bit precision used in arithmetic coding. For example, by shifting the probability interval range codIRange included in the input information six bits left and adding 256, the code amount calculating device converts the 2-bit precision probability interval range codIRange into a 9-bit precision probability interval range.

Next, the code amount calculating device sequentially repeats the processes in the below-mentioned step S204 to step S222 for each binary symbol binVal included in the binary symbol string included in the input information (S202).

The code amount calculating device obtains qCodIRangeIdx indicating the value of the most significant digit of the codIRange. Subsequently, the code amount calculating device obtains the probability interval range of the least possible symbol codIRangeLPS corresponding to the qCodIRangeIdx and the probability state index pStateIdx, by referring to the probability interval range updating table rangeTabLPS shown in FIG. 7. Furthermore, the code amount calculating device updates the probability interval range codIRange to the probability interval range of the least probable symbol (codIRange-codIRangeLPS) (S204).

Next, the code amount calculating device judges whether the binary symbol binVal is the most probable symbol or the least probable symbol (S206).

Here, when the binary symbol binVal is the most probable symbol (No in S206), the code amount calculating device updates the probability state index pStateIdx based on the transIdxMPS that can be obtained from the probability state index updating table shown in FIG. 8.

On the other hand, when the binary symbol binVal is the least probable symbol (Yes in S206), the code amount calculating device updates the probability interval range codIRange to the probability interval range of the least probably symbol codIRangeLPS. In addition, the code amount calculating device judges whether or not the probability state index pStateIdx is "0" (S212).

Here, when the probability state index pStateIdx is "0" (No in S212), the most probable symbol vaIMPS is switched from "0" to "1", or from "1" to "0" (S214). Next, the code amount calculating device updates the probability state index pStateIdx based on the transIdxLPS that can be obtained from the probability state index updating table shown in FIG. 8 (S216).

On the other hand, when the probability state index pStateIdx is not "0" (Yes in S212), the code amount calculating device updates the pStateIdx based on the transIdxLPS that can be obtained from the probability state index updating table shown in FIG. 8 (S216).

In this manner, in step S208 or step S216, after the probability state index pStateIdx is updated, the code amount calculating device judges whether or not the probability interval range codIRange is smaller than "0x100" (S218). Here, when the probability interval range codIRange is equal to or greater than "0x100" (No in S218), the process returns to step S202.

On the other hand, when the probability interval range codIRange is less than "0x100" (Yes in S218), 1 is added to the code amount (S220).

Next, the code amount calculating device shifts, by one bit to the left (doubles), the value of the probability interval range codIRange (S222), and the process returns to step S218.

After the loop process of step S202 ends, the code amount calculating device converts the bit precision of the probability interval range (S224). Specifically, the code amount calculating device converts the calculated probability interval range into a probability interval range having the same bit precision as in the input information. More specifically, the code amount calculating device converts the bit precision of the probability interval range using the same calculation as the calculation performed for the qCodIRangeIdx in step S204.

In such manner, the code amount calculating device calculates the estimate code amount, symbol occurrence probability information, and probability interval obtained after arithmetic coding of the binary symbol string by repeating the calculation process for the code amount, the symbol occurrence probability information, and the probability interval range, for each binary symbol included in the binary symbol string. Subsequently, the output information calculated in the above-described manner is stored in the code amount estimation table 204a in association with the input information.

It should be noted that the binary symbol binVal, the probability interval range codIRange, probability interval lower limit value codILow, the most probable symbol vaIMPS, and the probability state index pStateIdx are used in the arithmetic coding performed by the arithmetic coding unit 107. In contrast, the code amount calculation shown in FIG. 6 does not require the use of the probability interval lower limit value codILow since codeword identification is not necessary. With this, the code amount calculating device can calculate the code amount at a higher speed than when calculating the code amount using the result of actual arithmetic coding of the binary symbol string.

As described above, since the code amount estimating device 200 in the present embodiment can calculate the estimate code amount for the binary data string by referring to the code amount estimation table 204a, the code amount estimating device 200 is able to estimate the code amount after the arithmetic coding of binary data at high speed and with high precision. As a result, the code amount estimating device 200 is also able to estimate, in real time, the code amount obtained after arithmetic coding of binary data.

Furthermore, the code amount estimating device 200 can update the held symbol occurrence probability information and probability interval range to the symbol occurrence probability information and probability interval range that are needed when coding the next binary symbol string included in the binary data. Therefore, the code amount estimating device 200 can estimate the code amount with high precision when arithmetic coding is performed consecutively on the binary symbol strings included in the binary data.

Furthermore, the code amount estimating device 200 can process, in one operation, a binary symbol string made up of binary symbols for which the calculated context index is the same. Therefore, the code amount estimating device 200 can calculate the estimate code amount for one input binary symbol string in one operation, since there is no need to switch symbol occurrence probability information within the binary symbol string. Therefore, the code amount estimating device 200 can perform, at high speed, the estimation of the code amount obtained after arithmetic coding.

Furthermore, since the code amount estimating device 200 can collectively estimate the code amount for two or more binary symbols, the code amount estimating device 200 is able to estimate the code amount for the binary data after the arithmetic coding at a higher speed than when estimating the code amount on a per binary symbol basis.

Furthermore, the image coding apparatus 100 can control, adaptively and in real time, the code amount for image data after coding, according to the code amount estimated at high speed and with high precision by the code amount estimating device 200.

(First Modification)

Next, a first modification of the embodiment of the present invention shall be described. The code amount estimating device 200 in the present modification is characterized by referring to a code amount estimation table 204b to calculate the estimate code amount for a binary symbol string made up of only binary symbols which indicate "1".

Hereafter, the code amount estimating device 200 in the present modification shall be described focusing on the points of difference from the code amount estimating device 200 in the previously described embodiment.

The context index calculation unit 201 collectively outputs, to the estimate code amount calculation unit 204, a binary symbol string made up of only consecutive binary symbols having the same context index and the same value.

The estimate code amount calculation unit 204 obtains, by referring to the code amount estimation table 204b, the estimate code amount, the symbol occurrence probability information, and the probability interval range which correspond to the binary symbol string (input binary symbol string) outputted from the context index calculation unit 201, the symbol occurrence probability information outputted from the symbol occurrence probability information holding unit 202, and the probability interval range held by the probability interval information holding unit 203, respectively.

Specifically, the estimate code amount calculation unit 204 obtains the estimate code amount for the input binary symbol string that includes only binary symbols indicating "1", by referring to the code amount estimation table 204b. On the other hand, the estimate code amount calculation unit 204 calculates the estimate code amount for an input binary symbol string that includes only binary symbols indicating "0", by using the code amount calculation shown in FIG. 6.

FIG. 9 is a diagram showing an example of the code amount estimation table in the first modification of the embodiment of the present invention. As shown in FIG. 9, binary symbol strings that include only binary symbols indicating "1", among binary symbols indicating either "0" or "1", are stored in the code amount estimation table 204b in the present modification.

In this manner, since only binary symbol strings that include only binary symbols indicating "1" are stored in the code amount estimation table 204b, the number of combinations for the binary symbol strings having a symbol length L stored in the code amount estimation table 204b are reduced, from $2^L$ combinations, to L combinations. Therefore, since the amount of data in the code amount estimation table 204b is reduced, the circuit size of the code amount estimating device 200 can be further reduced.

Furthermore, the prefix parts of quantized orthogonal transform coefficients and motion vectors which occupy a large percentage of the data included in a binary symbol are binarized using a truncated unary binarization method such that shown in FIG. 10. In a symbol string that is binarized using this method, the percentage of consecutive binary symbols indicating "1" is large. Specifically, as in the present modification, even when collectively processing only consecutive binary symbols having the same value, it is possible to collectively process a majority of the binary data having the same context index, and thus processing speed does not deteriorate significantly. In other words, the code amount estimating device 200 in the present modification can suppress the deterioration of estimating speed due to the reduction in the amount of data.

It should be noted that, in the present modification, binary symbol strings that include only binary symbols indicating "0" may be stored in the code amount estimation table 204b, in the same manner as the binary symbol strings that include only binary symbols indicating "1". In this case, the estimate code amount calculation unit 204 also obtains the estimate code amount for an input binary symbol string that includes only binary symbols indicating "0", by referring to the code amount estimation table 204b. In such manner, by storing binary symbol strings that include only binary symbols indicating "1" and binary symbol strings that include only binary symbols indicating "0" in the code amount estimation table 204b, the number of combinations for the binary symbol strings having a symbol length L stored in the code amount estimation table 204b is reduced, from $2^L$ combinations, to 2L combinations.

(Second Modification)

Next, a second modification of the embodiment of the present invention shall be described. The code amount estimating device 200 in the present modification is characterized by referring to a code amount estimation table 204c to obtain an estimate code amount corresponding to a predetermined binary symbol string.

Hereafter, the code amount estimating device 200 in the present modification shall be described focusing on the points of difference from the code amount estimating device 200 in the previously described embodiment.

The context index calculation unit 201 collectively outputs, to the estimate code amount calculation unit 204, a binary symbol string which includes only binary symbols having the same context index and matches any of predetermined binary symbol strings.

Here, the predetermined binary symbol strings are, for example, truncated unary binarization method-based binary symbol strings. Hereinafter, the binarization of quantized coefficients shall be described, as a specific example, using FIG. 10.

FIG. 10 is a diagram for describing a method for binarizing quantized coefficients. As shown in FIG. 10, in the binarization, a quantized coefficient is converted to an output binary symbol string having at least the prefix part out of a prefix part and a suffix part.

Here, the binary symbol strings included in the prefix part shown in FIG. 10 are binary symbol strings that has been binarized according to the truncated unary binarization method. Therefore, binary symbol strings that are based on the binary symbol strings included in the prefix part shown in FIG. 10 correspond to predetermined binary symbol strings.

It should be noted that it is preferable that, in the binary symbol strings included in the prefix part, binary symbol strings from which the first binary symbol has been removed are the predetermined binary symbol strings. Specifically, it is preferable that the predetermined binary symbol strings include (i) a binary symbol string a predetermined symbol length or less and in which only the last binary symbol is "0" and (ii) a binary symbol string of the predetermined symbol length and in which all binary symbols are "1". This is because, when quantized coefficients are binarized according to the truncated unary binarization method, the context index of the first binary symbol is different from those of the rest of the binary symbols. Furthermore, it is preferable that binary symbols included in the suffix part are not included in the predetermined binary symbol strings because these are a binary symbols coded using the Exponential-Golomb coding method and thus the coding method in arithmetic coding is different.

In this manner, the estimate code amount calculation unit 204 obtains, by referring to the code amount estimation table 204c, the estimate code amount, the symbol occurrence probability information, and the probability interval range which correspond to the binary symbol string (input binary symbol string) outputted from the context index calculation unit 201, the symbol occurrence probability information outputted from the symbol occurrence probability information holding unit 202, and the probability interval range held by the probability interval information holding unit 203, respectively.

Specifically, the estimate code amount calculation unit 204 obtains the estimate code amount for the input binary symbol string that matches any of the predetermined binary symbol strings, by referring to the code amount estimation table 204c. On the other hand, the estimate code amount calculation unit 204 calculates the estimate code amount for an input binary symbol string that does not match any of the predetermined binary symbol strings, by using the code amount calculation shown in FIG. 6.

FIG. 11 is a diagram showing an example of the code amount estimation table in the second modification of the embodiment of the present invention. As shown in FIG. 11, predetermined binary symbol strings are stored in the code amount estimation table 204c in the present modification.

In this manner, since only the predetermined binary symbol strings are stored in the code amount estimation table 204c, the number of combinations for the binary symbol strings having a symbol length L stored in the code amount estimation table 204c is reduced. Therefore, since the amount of data in the code amount estimation table 204c is reduced, the circuit size of the code amount estimating device 200 can be further reduced.

Furthermore, the code amount estimating device 200 in the present modification can calculate, by referring to the code amount estimation table 204c, the estimate code amount for a binary symbol string obtained from the binarization of quantized coefficients using the truncated unary binarization method. Therefore, the code amount estimating device 200 can estimate, at high speed, the code amount obtained after arithmetic coding of binary data. Furthermore, since the code amount estimating device 200 can calculate, at high speed, the estimate code amount for the binary symbol strings that are largely included in the binary data, the code amount estimating device 200 is able to suppress the deterioration of estimation speed due to the reduction in the number of combinations of the input information to be stored in the code amount estimation table 204c.

Although the code amount estimating device or the image coding apparatus including the code amount estimating device according to the present invention has been described thus far using an embodiment and modifications thereof, the present invention is not limited to such embodiment and modifications. Various types of modifications to the present embodiment and to the present modifications, or embodiments implemented through a combination of components from different embodiments or modifications thereto, that may be conceived by a person of ordinary skill in the art, that do not depart from the essence of the present invention are intended to be included within the scope of the present invention.

For example, there is no need for the code amount estimating device 200 to refer to a code amount estimation table to calculate the estimate code amounts for all the binary symbols included in binary data. For example, the estimate code amount calculation unit 204 may estimate the code amount for a binary symbol coded by bypass coding, by counting the number of the binary symbol.

The suffix part of an orthogonal transform coefficient and a motion vector is binarized by Exponential-Golomb coding. A binary symbol obtained by such type of binarization is coded, not by the normal arithmetic coding, but by a method called bypass coding. In bypass coding, a 1-bit codeword is generated for an input of one binary symbol, and thus the code amount can be calculated by simply counting the bit length. Therefore, by counting the number of binary symbols, the estimate code amount calculation unit 204 can estimate, at high speed, the code amount for binary symbols coded by bypass coding.

Furthermore, although in the previously described embodiment and the modifications, the code amount estimating device 200 calculates the estimate code amount by referring to a code amount estimation table which is an example of code amount information, the code amount estimating device 200 may estimate the code amount according to code amount information consisting of relational expressions indicating the association between input information and output information.

Furthermore, the present invention can be implemented not only as such a code amount estimating device but also as a code amount estimation method having, as steps, the operations of the characteristic components included in such a code amount estimating device. Furthermore, the present invention can also be implemented as a program which causes a computer to execute such a code amount estimation method through the execution of the steps included in the code amount estimation method by a Central Processing Unit (CPU). Moreover, it should be obvious that such a program can be distributed via a recording medium such as a CD-ROM or a non-volatile memory and so on, or via a transmission medium such as the Internet and the like. In addition, one or more of the steps included in the code amount estimation method may be executed by an Integrated Circuit (IC) such as a logic circuit and so on.

It should be noted that the code amount estimating device according to an aspect of the present invention may include a CPU, a system Large Scale Integration (LSI), a Random Access Memory (RAM), a Read Only Memory (ROM), a Hard Disk Drive (HDD), a network interface, and so on. In addition, such code amount estimating device may also include a drive device capable of performing reading and writing on a portable recording medium such as a DVD-RAM, a Blu-ray Disk (Trademark), and a Secure Digital (SD) memory card.

It should be noted that the code amount estimating device may also be a built-in system such as a digital video camera, a digital recorder, a digital television, a game device, a mobile phone, and the like.

In addition, a program (hereinafter called a code amount estimation program) for controlling the code amount estimating device may be installed in an HDD, a ROM, or the like, and the respective functions of the code amount estimating device may be implemented by executing the code amount estimation program.

It should be noted that the code amount estimation program may be recorded on a recording medium that can be read in a hardware system such as a computer system, a built-in system, and the like. In addition, the code amount estimation program may be read and executed in another hardware system via a recording medium. With this, the respective functions of the code amount estimating device can be implemented in another hardware system. Here, optical recording media (for example, a CD-ROM, and the like), magnetic recording media (for example, a hard disk, and the like), magnetooptical recording media (for example, an MO, and the like), semiconductor memories (for example, a memory card, and the like), and so on, are available as computer system-readable recording media.

Furthermore, the code amount estimation program may be held by a hardware system connected to a network such as the Internet, a local area network, and the like. In addition, the code amount estimation program may be downloaded via a network and executed by another hardware system. With this, the respective functions of the code amount estimating device can be implemented in another hardware system. Here, ground-based networks, satellite networks, Power Line Communication (PLC), mobile phone networks, wired communication networks (for example, IEEE 802.3, and the like), and wireless communication networks (for example, IEEE 802.11, and so on) are available as networks.

Alternatively, the respective functions of the code amount estimating device may be implemented through a code amount estimating circuit mounted in the code amount estimating device.

It should be noted that the present invention may be implemented as a semiconductor integrated circuit (LSI: Large Scale Integration) implementing part or all of the functions of the code amount estimating device or the image coding apparatus. Specifically, the present invention may be implemented as an integrated circuit including all the components of the code amount estimating device or the image coding apparatus shown in FIG. 1.

Such an integrated circuit may be formed using a full-custom LSI, a semi-custom LSI such as an Application Specific Integrated circuit (ASIC), a programmable logic device such as a Field Programmable Gate Array (FPGA) or a Complex Programmable Logic Device (CPLD), and a dynamic reconfigurable device which allows dynamic rewriting of circuit configuration.

In addition, the design data for forming the respective functions of the code amount estimating device in a code amount estimating circuit may be a program written in hardware description language (hereafter called HDL program). In addition, the design data may be a gate-level netlist obtained by performing logic synthesis on the HDL program. Furthermore, the design data may be macrocell information obtained by adding position information, process conditions, and so on, to the gate-level netlist. Furthermore, the design data may be master data in which dimensions, timing, and so on are stipulated. Here, Very high-speed integrated circuit Hardware Description Language (VHDL), Verilog-HDL, and System C are available as hardware description language.

In addition, the design data may be recorded on a recording medium that can be read in a hardware system such as a computer system, a built-in system, and the like. In addition, the design data may be read and executed in another hardware system via recording media. Subsequently, the design data that is read out by another hardware system via these recording media may be downloaded into a programmable logic device via a download cable.

Alternatively, the design data may be held by a hardware system connected to a network such as the Internet, a local area network, and the like. In addition, the design data may be downloaded via a network and executed by another hardware system. In addition, the design data obtained by another hardware system via these networks may be downloaded into a programmable logic device via a download cable.

Alternatively, the design data may be recorded in advance on a serial ROM to allow transmission to an FPGA when current is applied. In addition, the design data recorded on a serial ROM may be downloaded directly by an FPGA when current is applied.

Alternatively, the design data may be generated by a microprocessor and downloaded by an FPGA, when current is applied.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

Industrial Applicability

The present invention can be used as a code amount estimating device capable of estimating, in real time and with high precision, code amount obtained after arithmetic coding, and particularly as an image coding apparatus which includes the code amount estimating device and controls the code amount based on the estimated code amount.

What is claimed is:

1. A code amount estimating device which calculates an estimate code amount that is estimated to be an amount of code obtained after arithmetic coding of binary data, said code amount estimating device comprising:
   a symbol occurrence probability information holding unit configured to hold, in association with a context index, symbol occurrence probability information indicating an occurrence probability of a binary symbol included in the binary data;
   a probability interval information holding unit configured to hold a probability interval range indicating a range of an interval on a probability number line;
   a context index calculation unit configured to calculate the context index of the binary symbol included in the binary data; and
   an estimate code amount calculation unit configured to calculate an estimate code amount for the binary data based on (i) the symbol occurrence probability information held in association with the calculated context index and (ii) the probability interval range that is held,
   wherein said estimate code amount calculation unit is configured to calculate the estimate code amount for the binary data according to code amount information indicating an association between (i) a combination of a binary symbol string, symbol occurrence probability information, and a probability interval range and (ii) an estimate code amount for the binary symbol string, the binary symbol string including one or more binary symbols.

2. The code amount estimating device according to claim 1, wherein the probability interval range is represented using a bit precision that is lower than a bit precision of a probability interval range used in the arithmetic coding of the binary data.

3. The code amount estimating device according to claim 1, wherein the code amount information includes a first table in which each of estimate code amounts is stored in association with a corresponding combination of a binary symbol string, symbol occurrence probability information, and a probability interval range, and
   said estimate code amount calculation unit is configured to calculate the estimate code amount for the binary data by obtaining, with reference to the first table, an estimate code amount for each binary symbol string included in the binary data.

4. The code amount estimating device according to claim 1, wherein the code amount information includes a second table in which each of probability interval ranges obtained after arithmetic coding is stored in association with a corresponding combination of a binary symbol string, symbol occurrence probability information, and a probability interval range, and
   for each binary symbol string included in the binary data, said estimate code amount calculation unit is configured to obtain a probability interval range, with reference to the second table, and to update the probability interval range held in said probability interval information holding unit to the obtained probability interval range.

5. The code amount estimating device according to claim 1, wherein the code amount information includes a third table in which each of symbol occurrence probability information obtained after arithmetic coding is stored in association with a corresponding combination of a binary symbol string and symbol occurrence probability information, and
   for each binary symbol string included in the binary data, said estimate code amount calculation unit is configured to calculate symbol occurrence probability information, with reference to the third table, and to update the symbol occurrence probability information held by said symbol occurrence probability information holding unit to the obtained symbol occurrence probability information.

6. The code amount estimating device according to claim 1, wherein said estimate code amount calculation unit is configured to calculate the estimate code amount for the binary data by calculating, according to the code amount information, an estimate code amount for a binary symbol string made up of two or more consecutive binary symbols included in the binary data.

7. The code amount estimating device according to claim 1, wherein said estimate code amount calculation unit is configured to calculate the estimate code amount for the binary data by calculating, according to the code amount information, an estimate code amount for a binary symbol string made up of one binary symbol or consecutive binary symbols included in the binary data and having a same calculated context index.

8. The code amount estimating device according to claim 1, wherein said estimate code amount calculation unit is configured to calculate the estimate code amount for the binary data by calculating, according to the code amount information, an estimate code amount for a binary symbol string made up of one binary symbol or consecutive binary symbols included in the binary data and having a same value.

9. The code amount estimating device according to claim 8, wherein the same value is 1.

10. The code amount estimating device according to claim 1,
wherein said estimate code amount calculation unit is configured to calculate the estimate code amount for the binary data by calculating, according to the code amount information, an estimate code amount for a binary symbol string that (i) is made up of one binary symbol or consecutive binary symbols included in the binary data and (ii) matches any of predetermined binary symbol strings, and
the predetermined binary symbol strings include (i) a binary symbol string having a length equal to or less than a predetermined symbol length and in which only the last binary symbol is 0 and (ii) a binary symbol string having the predetermined symbol length and in which all the binary symbols are 1.

11. The code amount estimating device according to claim 1,
wherein said estimate code amount calculation unit is configured to calculate an estimate code amount for a binary symbol included in the binary data and coded using bypass coding, by counting the binary symbol.

12. An image coding apparatus which codes image data, said image coding apparatus comprising:
said code amount estimating device according to claim 1; and
a code amount control unit configured to control a code amount obtained after arithmetic coding of the image data, using the estimate code amount calculated by said code amount estimating device.

13. A code amount estimation method for calculating an estimate code amount that is estimated to be an amount of code obtained after arithmetic coding of binary data, said code amount estimating method comprising:
calculating a context index of a binary symbol included in the binary data; and
calculating an estimate code amount for the binary data based on (i) symbol occurrence probability information held in association with the calculated context index and (ii) the probability interval range that is held,
wherein in said calculating of an estimate code amount, the estimate code amount for the binary data is calculated according to code amount information indicating an association between (i) a combination of a binary symbol string, symbol occurrence probability information, and a probability interval range and (ii) an estimate code amount for the binary symbol string, the binary symbol string including one or more binary symbols.

14. An integrated circuit which calculates an estimate code amount that is estimated to be an amount of code obtained after arithmetic coding of binary data, said integrated circuit comprising:
a symbol occurrence probability information holding unit configured to hold, in association with a context index, symbol occurrence probability information indicating an occurrence probability of a binary symbol included in the binary data;
a probability interval information holding unit configured to hold a probability interval range indicating a range of an interval on a probability number line;
a context index calculation unit configured to calculate the context index of the binary symbol included in the binary data; and
an estimate code amount calculation unit configured to calculate an estimate code amount for the binary data based on (i) the symbol occurrence probability information held in association with the calculated context index and (ii) the probability interval range that is held,
wherein said estimate code amount calculation unit is configured to calculate the estimate code amount for the binary data according to code amount information indicating an association between (i) a combination of a binary symbol string, symbol occurrence probability information, and a probability interval range and (ii) an estimate code amount for the binary symbol string, the binary symbol string including one or more binary symbols.

* * * * *